July 13, 1948.  R. B. CURELL, JR  2,445,134

TRACTOR-TRAILER CONSTRUCTION

Filed Aug. 9, 1945  3 Sheets-Sheet 1

Inventor:
Randal B Curell Jr.
by his Attorneys
Howson &
Howson

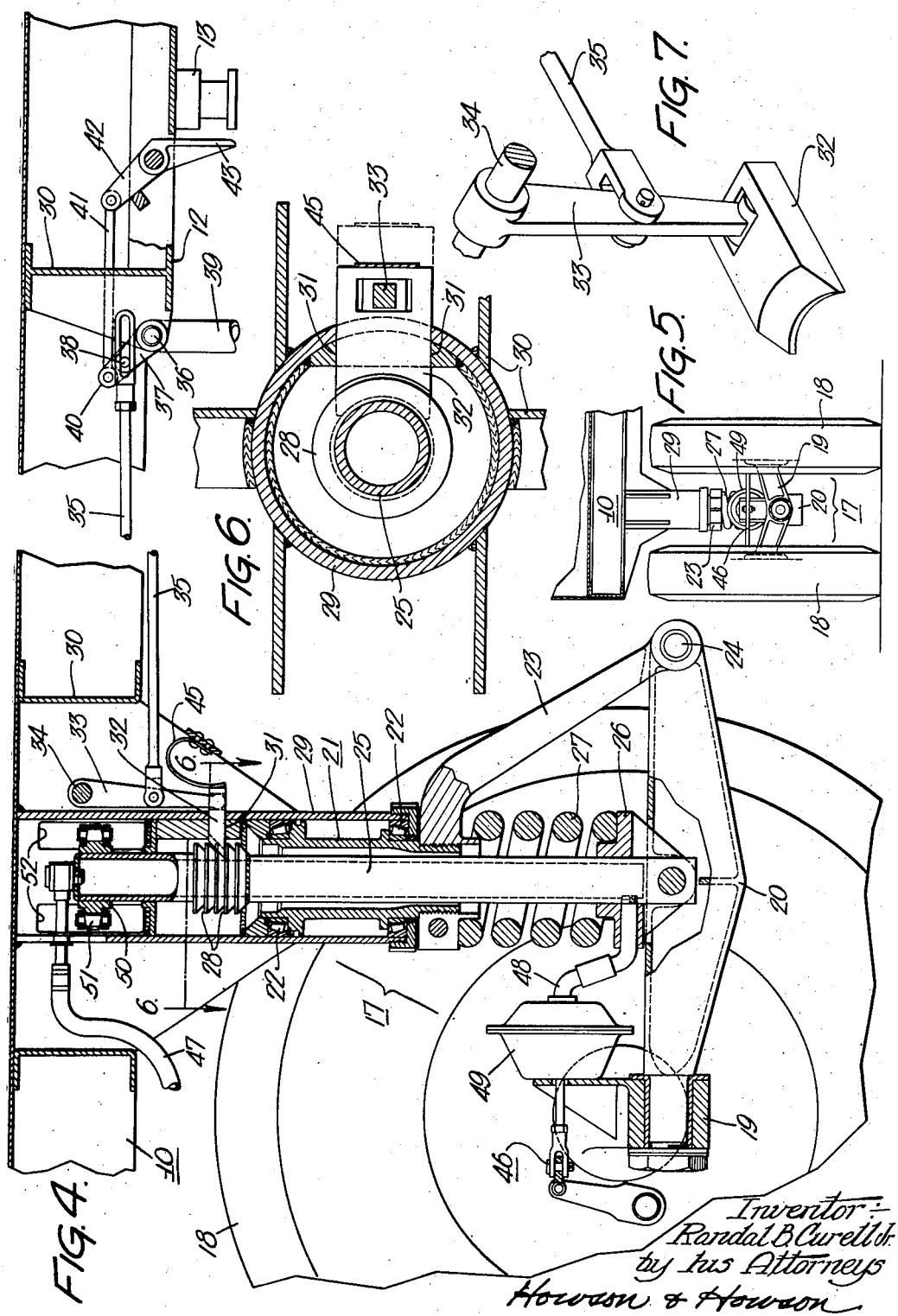

July 13, 1948. R. B. CURELL, JR 2,445,134
TRACTOR-TRAILER CONSTRUCTION
Filed Aug. 9, 1945 3 Sheets-Sheet 3
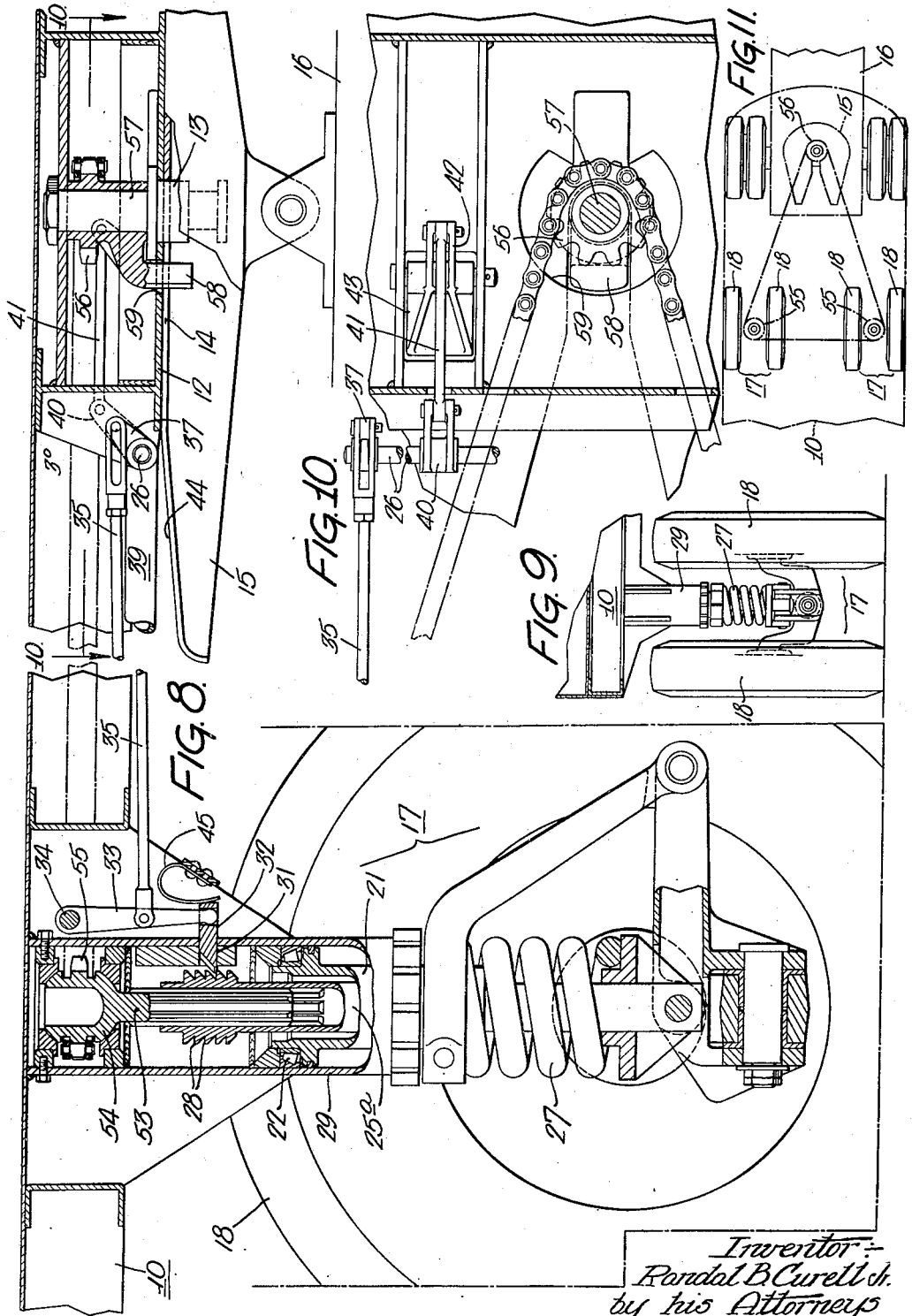
Inventor:-
Randal B Curell Jr.
by his Attorneys
Howson & Howson Patented July 13, 1948

2,445,134

UNITED STATES PATENT OFFICE 2,445,134

TRACTOR-TRAILER CONSTRUCTION

Randal B. Curell, Jr., Lansdowne, Pa.

Application August 9, 1945, Serial No. 609,777

17 Claims. (Cl. 280—33.05)

This invention relates to highway trailers and particularly to truck-trailers of that type in which the forward end is usually supported solely from the associated tractor element during road travel.

Trailers of this type are being called upon to carry increasingly heavy loads, and, since state regulations limit the load permitted on any one axle or set of wheels, it is desirable to provide the trailer with one or more axles (or sets of load carrying wheels) in addition to the conventional rear wheels.

An important object of this invention is the provision of an additional load supporting element for such trailers which will permit them to carry an increased pay load, and which may be disposed at the most advantageous position under the trailer.

A further object of the invention is the provision of a practical arrangement of ground-engaging, load-supporting road wheel units which may be disposed rearwardly of the fifth wheel element of the trailer through which the trailer is connected to the tractor.

A still further and more specific object of the invention is the provision of caster-mounted, load-supporting road wheel units arranged adjacent each side of the trailer adjacent the forward end thereof and adapted to support such forward end during both road travel and after disengagement of the tractor therefrom.

Another object of the invention is the provision of units of this character which are so constructed as to facilitate the engagement with and disengagement of the tractor from the trailer.

Another object of the invention is the provision of units of this character in which the load engaging wheels may be braked in common with the remaining supporting wheels of the trailer.

Another object of the invention is the provision of an arrangement of this character which will permit steering of the supplemental road wheel units in accordance with movements of the tractor.

Another object of the invention is the provision of means whereby the caster mounted road wheel units serve to elevate the forward or tractor-engaging end of the trailer as load is removed therefrom, and to lock the trailer in this elevated position thereby facilitating the engagement of the tracking unit therewith.

These and other objects I attain by the construction shown in the accompanying drawings wherein for the purpose of illustration I have shown a preferred embodiment of my invention and wherein:

Fig. 4 is an enlarged vertical sectional view through the mounting of one of the units;

Fig. 5 is a rear elevation of the lower end of one of the units;

Fig. 6 is a section on line 6—6 of Fig. 4;

Fig. 7 is a perspective view of the latching mechanism;

Fig. 8 is a vertical sectional view through a slightly modified form of unit mounting;

Fig. 9 is a rear elevation of the unit shown in Fig. 8;

Fig. 10 is a section on line 10—10 of Fig. 8; and

Fig. 11 is a semi-diagrammatic view illustrating the operation of the steering control.

Figure 1:
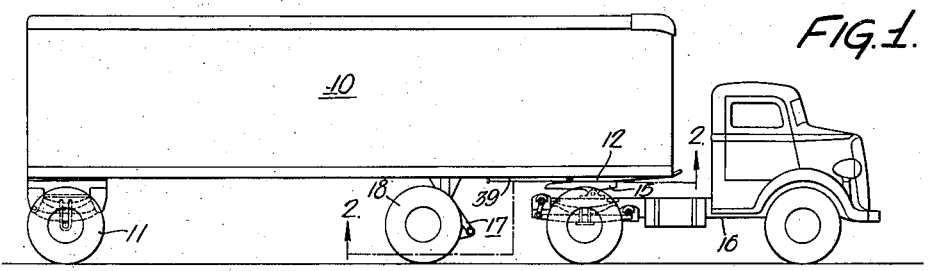
Fig. 1 is a side elevation of a tractor trailer combination embodying my invention.
Figure 2:
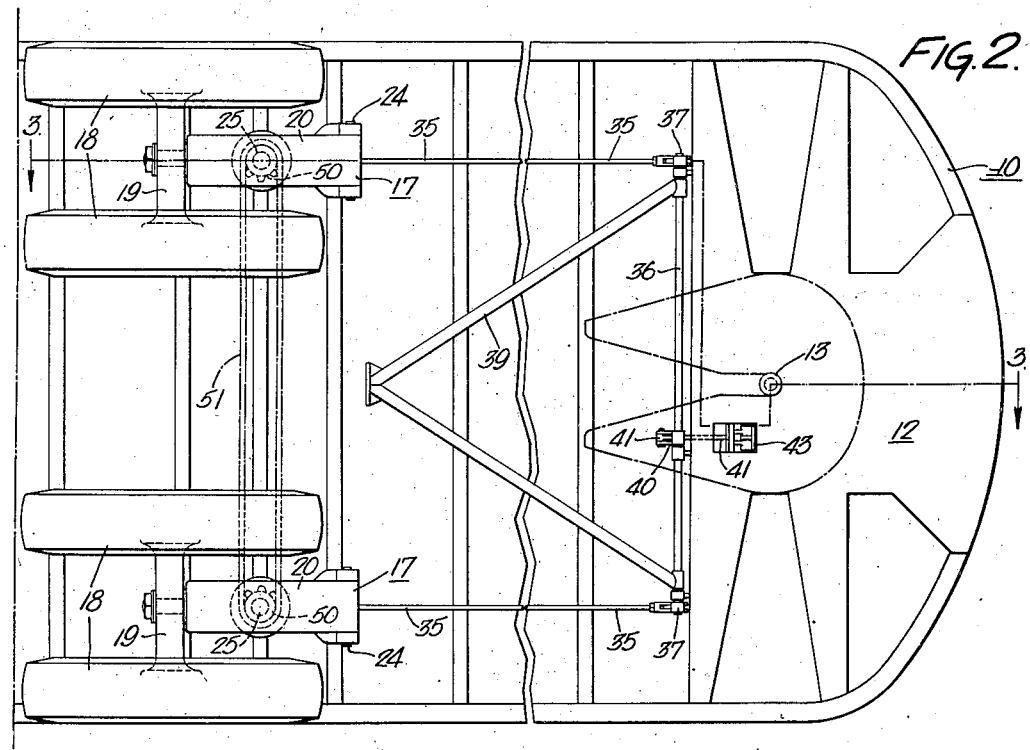
Fig. 2 is a fragmentary bottom plan view of the forward end of the trailer.

Referring now more particularly to the drawings, the numeral 10 generally designates the trailer body having rear supporting wheels and provided at its forward end with the upper element 12 of a fifth wheel. This upper element has the usual depending stud 13 to engage in the slot 14 in the fifth wheel element 15 of the tractor vehicle 16 and be locked therein. Arranged immediately rearwardly of the fifth wheel unit 12 at each side of the trailer body 10 is a caster-mounted road wheel unit 17. These units may embody either one or more pneumatic tired wheels 18, two being shown in the present instance. The mountings for these road wheels comprise an axle 19 upon which the wheels are mounted, a lever 20 upon which the axle is horizontally pivoted and a member 21 mounted in vertical bearings 22 and having a depending arm 23 to which the lever 20 is pivoted as at 24. The member 21 is tubular and secured to the lever 20 is a vertical shaft element 25 having adjacent its lower end a spring seat 26 between which and member 21 and in surrounding relation to the shaft 25, a spring 27 is disposed. Springs 27 are of such strength that the combined pressure exerted thereby in the two units is sufficient to elevate the forward end of trailer 10 when unloaded.

Adjacent its upper end, shaft 25 is provided with a series of annular ratchet teeth 28. As at present shown, the bearings 22 of member 21 are mounted in vertically disposed tubular housings 29 rigidly secured to and depending from the frame 30 of the trailer body 10. Extending through and guided in slots 31 in the housings are spring engaged dogs 32 for coaction with the annular ratchet teeth 28. The dogs 32 are engaged by the lower ends of levers 33 pivoted at 34 and engaged intermediately at their ends by links 35. Mounted in the frame 30, and more specifically on the fifth wheel element 12 which is an element thereof, is a rock shaft 36 having arms 37 with which the forward ends of links 35 are connected as at 38. An emergency prop 39 may be secured to the shaft 36 for oscillatory movement. Likewise secured to this shaft is an arm 40 linked at 41 to the upper end of a lever 42, the lower end of which is in the form of a shoe 43 arranged in the path of and adapted to be engaged and oscillated by the downwardly sloping rear end 44 of the tractor-borne fifth wheel element 15.

Figure 3:
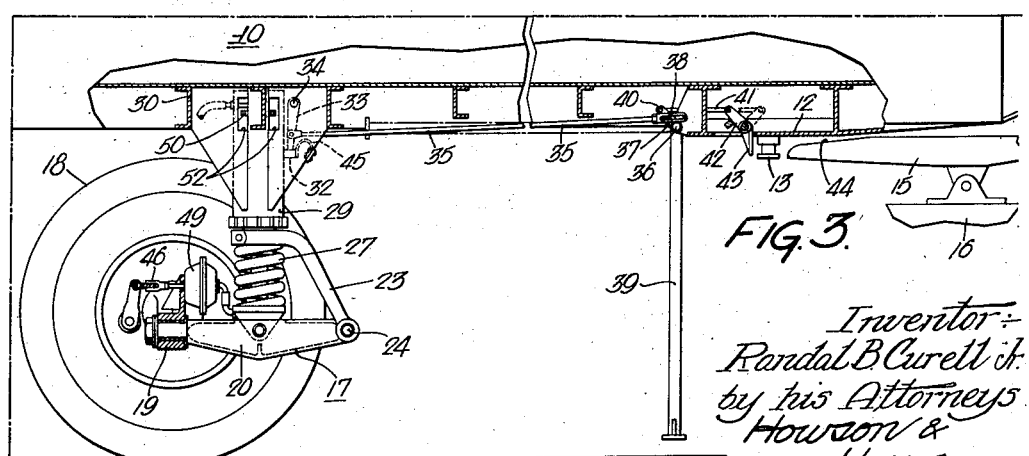
Fig. 3 is a section on line 3—3 of Fig. 2, the safety prop being shown in its operative position.

The oscillation of lever 42 is sufficient during engagement of the fifth wheel elements of the trailer and tractor to shift the emergency prop 39 from its vertical position of Fig. 4 to its transport or horizontal position of Fig. 3. It is likewise sufficient to disengage dogs 32 from their respective ratchet elements and thus permit unrestricted rise and fall of shaft 25 and accordingly of the road wheels 18. When the fifth wheel elements of the tractor and trailer are disengaged, the lever 42 resumes the position of Fig. 4 under the influence of springs such for example as the springs 45 of dogs 32.

As shown in Figs. 1 to 7, shaft 25 may be tubular and road wheels 18 may be provided with fluid pressure brake mechanisms 46 of any suitable type. Fluid pressure may be supplied through a flexible tube 47 communicating with the upper end of shaft 25 and a flexible tubular connection 48 disposed between the lower end of the shaft and the operating cylinder 49 of brake mechanism 46. It is desirable in a construction of this character that independent caster movement of the wheel units be eliminated and to this end, I secure to the upper end of each shaft 25 a sprocket wheel 50 which connects these wheels by a chain 51 extending through vertical slots 52 in housing members.

The form of invention shown in Figs. 8 to 11 differs from that already described principally in the fact that means are likewise provided for imparting steering movements to the caster mounted road wheel units in accordance with steered movements of the tractor 16. In this construction the shafts 25a have splined in the upper end thereof shafts 53, the upper ends of which are mounted in swivel bearings 54 to compensate for the slight angular movements imparted to shafts 25a during rise and fall of the road wheels in relation to the vehicle body. Upon the upper ends of shafts 53 are provided sprocket wheels 55 connected to one another and to a sprocket 56 rotatably mounted upon the shank 57 of stud 13. The hub of sprocket gear 56 has a depending lug 58 directed through a slot 59 in the upper fifth wheel member 12 and adapted to engage in the slot 14 of the tractor mounted lower fifth wheel member 15. It will be seen that when the fifth wheel elements are in engagement with one another sprocket 56 will be oscillated about the shank 57 in accordance with movements of the lower fifth wheel element 15 and that these movements will be imparted to shafts 25a through the shafts 53. It will also be noted from the inspection of Figs. 8 to 11 that the type of mounting employed for the road wheel axle may be considerably varied and the brakes may be employed or not as desired.

It will be obvious that in both constructions illustrated, since springs 27 of the combined units are of sufficient strength to elevate the forward end unloaded body 10, that when a trailer which is disposed at a destination at which it is uncoupled from the tractor during unloading these springs will serve to elevate the body during unloading. Since the highest elevation attained by the body will be retained under these circumstances due to the ratchet mechanisms employed, even though the body be reloaded following such unloading, the forward end of the body will remain at a proper height to enable easy reengagement of the tractor therewith. Even though the body may at the time of initial engagement of the upper and lower fifth wheel elements be somewhat higher than it should be for proper seating of the element 12 upon the element 15, when the element 15 attains a predetermined position beneath the element 12 the action of lever 42 will release the ratchet mechanisms permitting the forward end of the tractor to settle to its proper position. It will be obvious that this ratchet will serve at all times to limit the downward movement of the forward end of the trailer as the tractor is disengaged therefrom thereby facilitating reengagement of the tractor therewith. Safety prop 39 is ordinarily unnecessary and is of principal value as an insurance against forward tipping of the trailer about the units 17 such as might occur during unloading if the trailer were too heavily loaded at its forward end.

Since the constructions illustrated are obviously capable of considerable modification without departing from the spirit of my invention, I do not wish to be understood as limiting myself thereto except as hereinafter claimed.

I claim:

1. A truck-trailer having rear supporting wheels and having at its forward end a fifth wheel element for engagement with the mating element of a tractor, a caster mounted load supporting road wheel unit adjacent each side of the trailer intermediate the rear wheels and said fifth wheel element, and means connecting said wheel units insuring similar caster movements thereof.

2. A truck-trailer having rear supporting wheels and having at its forward end a fifth wheel element for engagement with the mating element of a tractor, a caster mounted road wheel unit adjacent each side of the trailer to the immediate rear of said fifth wheel element, means connecting said wheel units insuring similar caster movements thereof, and load supporting springs extending between the body of the trailer and the wheels of said units and having a combined strength such that they elevate the forward end of the trailer when unloaded.

3. A truck-trailer having rear supporting wheels and having at its forward end a fifth wheel element for engagement with the mating element of a tractor, a caster mounted road wheel unit adjacent each side of the trailer to the immediate rear of said fifth wheel element, load supporting springs extending between the body of the trailer and the wheels of said units and having a combined strength such that they elevate the forward end of the trailer when unloaded, and a tractor releasable ratchet mechanism maintaining the forward end of the trailer at its elevated position during disengagement of the tractor therefrom.

4. A tractor-drawn truck-trailer having rear supporting wheels and having at its forward end a fifth wheel element for engagement with the mating element of a tractor, caster mounted load supporting road wheels for the trailer to the immediate rear of said fifth wheel element, springs interposed between said wheels and the trailer body and of sufficient strength to elevate the forward end of the trailer when unloaded, and a releasable ratchet mechanism extending between said wheels and the trailer body to hold the body in its elevated position.

5. A tractor-drawn truck-trailer having rear supporting wheels and having at its forward end a fifth wheel element for engagement with the mating element of a tractor, caster mounted load supporting road wheels for the trailer to the immediate rear of said fifth wheel element, springs interposed between said wheels and the trailer body and of sufficient strength to elevate the forward end of the trailer when unloaded, a releasable ratchet mechanism extending between said wheels and the trailer body to hold the body in its elevated position, and disengaged and engaged during engagement and disengagement of the fifth wheel elements of the trailer and tractor.

6. A truck-trailer having rear supporting wheels and having at its forward end a fifth wheel element for engagement with the mating element of a tractor, a caster mounted load supporting road wheel unit adjacent each side of the trailer intermediate the rear wheels and said fifth wheel element, and means operated by engagement of the fifth wheel elements of the tractor and trailer for connecting the units to the element of the tractor for steering thereby.

7. In a tractor-trailer combination, a trailer having rear supporting wheels and having at its forward end a fifth wheel element, a tractor having a fifth wheel element for coupling engagement with the mating element of the trailer, a caster mounted load supporting road wheel unit adjacent each side of the trailer intermediate the rear wheels and said fifth wheel element, and means operated by coupling engagement of the fifth wheel elements of the tractor and trailer for establishing steering engagement between said units and the fifth wheel of the tractor.

8. In a tractor-trailer combination, a trailer having rear supporting wheels and having at its forward end a fifth wheel element, a tractor having a fifth wheel element for engagement with the mating element of the trailer, a caster mounted road wheel unit adjacent each side of the trailer to the immediate rear of said fifth wheel element, load supporting springs extending between the body of the trailer and the wheels of said units and having a combined strength such that they elevate the forward end of the trailer when unloaded, and means released by coupling of the fifth wheel elements maintaining the spacing of the wheels and forward end of the trailer when said fifth wheel units are disengaged.

9. A truck-trailer having rear supporting wheels and having at its forward end a fifth wheel element for engagement with the mating element of a tractor, and a caster mounted road wheel unit adjacent each side of the trailer to the immediate rear of said fifth wheel element, each of said units comprising a tubular member mounted for rotation about a vertical axis, an arm secured to said tubular member, a lever pivoted to said arm and extending beneath the tubular member, an axle mounted on said lever and having at least one road supporting wheel, a shaft secured to said lever and extending vertically into the tubular member, and a spring surrounding said shaft between the lever and the lower end of the tubular member.

10. A truck-trailer having rear supporting wheels and having at its forward end a fifth wheel element for engagement with the mating element of a tractor, a caster mounted road wheel unit adjacent each side of the trailer to the immediate rear of said fifth wheel element, each of said units comprising a tubular member mounted for rotation about a vertical axis, an arm secured to said tubular member, a lever pivoted to said arm and extending beneath the tubular member, an axle mounted on said lever and having at least one road supporting wheel, a shaft secured to said lever and extending vertically into the tubular member, a spring surrounding said shaft between the lever and the lower end of the tubular member, and a releasable ratchet mechanism preventing upward vertical movement of the shaft.

11. A truck-trailer having rear supporting wheels and having at its forward end a fifth wheel element for engagement with the mating element of a tractor, a caster mounted road wheel unit adjacent each side of the trailer to the immediate rear of said fifth wheel element, each of said units comprising a tubular member mounted for rotation about a vertical axis, an arm secured to said tubular member, a lever pivoted to said arm and extending beneath the tubular member, an axle mounted on said lever and having at least one road supporting wheel, a shaft secured to said lever and extending vertically into the tubular member, a spring surrounding said shaft between the lever and the lower end of the tubular member, a releasable ratchet mechanism preventing upward vertical movement of the shaft, and means operated by engagement of said fifth wheel element with the mating element of a tractor for releasing said ratchet mechanism.

12. A truck-trailer having rear supporting wheels and having at its forward end a fifth wheel element for engagement with the mating element of a tractor, a caster mounted road wheel unit adjacent each side of the trailer to the immediate rear of said fifth wheel element, each of said units comprising a tubular member mounted for rotation about a vertical axis, an arm secured to said tubular member, a lever pivoted to said arm and extending beneath the tubular member, an axle mounted on said lever and having at least one road supporting wheel, a shaft secured to said lever and extending vertically into the tubular member, a spring surrounding said shaft between the lever and the lower end of the tubular member, and connections between said tubular member insuring similar rotative movements thereof.

13. A truck-trailer having rear supporting wheels and having at its forward end a fifth wheel element for engagement with the mating element of a tractor, a caster mounted road wheel unit adjacent each side of the trailer to the immediate rear of said fifth wheel element, each of said units comprising a tubular member mounted for rotation about a vertical axis, an arm secured to said tubular member, a lever pivoted to said arm and extending beneath the tubular member, an axle mounted on said lever and having at least one road supporting wheel, a shaft secured to said lever and extending vertically into the tubular member, and a spring surrounding said shaft between the lever and the lower end of the tubular member, the springs of said units having a combined strength sufficient to elevate the end of the trailer supported by said units when unloaded.

14. A truck-trailer having rear supporting wheels and having at its forward end a fifth wheel element for engagement with the mating element of a tractor, a caster mounted road wheel unit adjacent each side of the trailer to the immediate rear of said fifth wheel element, each of said units comprising a tubular member mounted for rotation about a vertical axis, an arm secured to said tubular member, a lever pivoted to said arm and extending beneath the tubular member, an axle mounted on said lever and having at least one road supporting wheel, a shaft secured to said lever and extending vertically into the tubular member, a spring surrounding said shaft between the lever and the lower end of the tubular member, connections between said tubular member insuring similar rotative movements thereof, and a releasable ratchet mechanism preventing upward vertical movement of the shaft.

15. A truck-trailer having rear supporting wheels and having at its forward end a fifth wheel element for engagement with the mating element of a tractor, a caster mounted road wheel unit adjacent each side of the trailer to the immediate rear of said fifth wheel element, each of said units comprising a tubular member mounted for rotation about a vertical axis, an arm secured to said tubular member, a lever pivoted to said arm and extending beneath the tubular member, an axle mounted on said lever and having at least one road supporting wheel, a shaft secured to said lever and extending vertically into the tubular member, a spring surrounding said shaft between the lever and the lower end of the tubular member, the springs of said units having a combined strength sufficient to elevate the end of the trailer supported by said units when unloaded, and a releasable ratchet mechanism preventing upward vertical movement of the shaft.

16. A truck-trailer having rear supporting wheels and having at its forward end a fifth wheel element for engagement with the mating element of a tractor, a caster mounted road wheel unit adjacent each side of the trailer to the immediate rear of said fifth wheel element, each of said units comprising a tubular member mounted for rotation about a vertical axis, an arm secured to said tubular member, a lever pivoted to said arm and extending beneath the tubular member, an axle mounted on said lever and having at least one road supporting wheel, a shaft secured to said lever and extending vertically into the tubular member, a spring surrounding said shaft between the lever and the lower end of the tubular member, connections between said tubular member insuring similar rotative movements thereof, a releasable ratchet mechanism preventing upward vertical movement of the shaft, and means operated by engagement of said fifth wheel element with the mating element of a tractor for releasing said ratchet mechanism.

17. A truck-trailer having rear supporting wheels and having at its forward end a fifth wheel element for engagement with the mating element of a tractor, a caster mounted road wheel unit adjacent each side of the trailer to the immediate rear of said fifth wheel element, each of said units comprising a tubular member mounted for rotation about a vertical axis, an arm secured to said tubular member, a lever pivoted to said arm and extending beneath the tubular member, an axle mounted on said lever and having at least one road supporting wheel, a shaft secured to said lever and extending vertically into the tubular member, a spring surrounding said shaft between the lever and the lower end of the tubular member, the springs of said units having a combined strength sufficient to elevate the end of the trailer supported by said units when unloaded, a releasable ratchet mechanism preventing upward vertical movement of the shaft, and means operated by engagement of said fifth wheel element with the mating element of a tractor for releasing said ratchet mechanism.

RANDAL B. CURELL, JR.

REFERENCES CITED

The following references are of record in the file of this patent:

UNITED STATES PATENTS

| Number | Name | Date |
|---|---|---|
| 1,923,255 | Chambers | Aug. 22, 1933 |
| 2,259,612 | Carmody | Oct. 21, 1941 |
| 2,271,304 | Mulholland | Jan. 27, 1942 |
| 2,273,503 | Couse | Feb. 17, 1942 |
| 2,347,524 | Swan | Apr. 25, 1944 |

FOREIGN PATENTS

| Number | Country | Date |
|---|---|---|
| 608,521 | France | July 28, 1926 |